(12) United States Patent
Jha et al.

(10) Patent No.: US 9,170,168 B2
(45) Date of Patent: Oct. 27, 2015

(54) SYSTEMS AND METHODS FOR DETERMINING MASS PROPERTIES OF VEHICLE COMPONENTS

(71) Applicant: GM Global Technology Operations LLC, Detroit, MI (US)

(72) Inventors: Pankaj K. Jha, Bangalore (IN); Praveenkumar Panuganti, Bangalore (IN); Michael D. Nienhuis, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 445 days.

(21) Appl. No.: 13/686,769

(22) Filed: Nov. 27, 2012

(65) Prior Publication Data

US 2014/0144256 A1 May 29, 2014

(51) Int. Cl.
*G01G 9/00* (2006.01)
*G01M 1/16* (2006.01)
*G01M 1/10* (2006.01)

(52) U.S. Cl.
CPC .. *G01M 1/16* (2013.01); *G01M 1/10* (2013.01)

(58) Field of Classification Search
None
See application file for complete search history.

(56) References Cited

U.S. PATENT DOCUMENTS

| 2003/0022502 A1* | 1/2003 | Matsui et al. | 438/692 |
| 2004/0185751 A1* | 9/2004 | Nakanishi et al. | 451/5 |
| 2007/0200396 A1* | 8/2007 | Baumann et al. | 297/135 |

* cited by examiner

*Primary Examiner* — Robert R Raevis
(74) *Attorney, Agent, or Firm* — Ingrassia Fisher & Lorenz, P.C.

(57) ABSTRACT

A system for measuring a mass property of an object is provided. The system includes a first shaft having a first end and a second end and a table disposed in a first plane and coupled to the first shaft at a predetermined angle to support the object. The table is configured to pivot about an axis perpendicular to the first plane between at least a first pivot position and a second pivot position. The system further includes a torque sensor configured to collect a first torque measurement on the first shaft when the table is in the first pivot position and a second torque measurement on the first shaft when the table in the second pivot position.

19 Claims, 11 Drawing Sheets

SYSTEMS AND METHODS FOR DETERMINING MASS PROPERTIES OF VEHICLE COMPONENTS

TECHNICAL FIELD

The technical field generally relates to systems and methods for determining mass properties, and more particularly relates to systems and methods for determining mass properties of irregular objects such as vehicle components.

BACKGROUND

Determining the mass properties of a vehicle about all three axes is important in the design and implementation of safety and stability mechanisms. Such mass properties associated with a vehicle may include the center of gravity and moments of inertia. While estimating the mass properties of regularly shaped objects may be relatively simple, it is more problematic with irregular objects such as vehicle components and the vehicle itself This is particularly true with respect to vehicle components provided by third party manufacturers in which design changes for a component may modify the associated mass properties for the component, vehicle system, and assembled vehicle.

Techniques for estimating mass properties of irregular objects may include a trifilar pendulum system and an inertia table system. The trifilar pendulum system includes a flat plate suspended by cables. The vehicle component is secured to the plate, and the plate is twisted and released. The mass properties about a single axis may be calculated based on characteristics of the resulting oscillations and the characteristics of the pendulum. The inertia table system includes a flat plate supported by a torsional spring. The vehicle component is secured to the plate, and the plate is twisted and released. The mass properties about a single axis may be calculated based on characteristics of the resulting oscillations and the characteristics of the torsional spring. Unfortunately, in each of these systems, the vehicle component must be carefully repositioned into an orthogonal arrangement relative to the first estimation to recalculate the mass characteristics about a second axis and again repositioned into another orthogonal arrangement to recalculate the mass characteristics about a third axis. Repositioning and refixturing the vehicle component into three mutually orthogonal orientations may be problematic and generally takes a substantial amount of time.

Accordingly, it is desirable to provide accurate and relatively expedient systems and methods for determining the mass properties of irregular components, particularly vehicle components. Furthermore, other desirable features and characteristics of the present invention will become apparent from the subsequent detailed description and the appended claims, taken in conjunction with the accompanying drawings and the foregoing technical field and background.

SUMMARY

In accordance with an exemplary embodiment, a system for measuring a mass property of an object is provided. The system includes a first shaft having a first end and a second end and a table disposed in a first plane and coupled to the first shaft at a predetermined angle to support the object. The table is configured to pivot about an axis perpendicular to the first plane between at least a first pivot position and a second pivot position. The system further includes a torque sensor configured to collect a first torque measurement on the first shaft when the table is in the first pivot position and a second torque measurement on the first shaft when the table in the second pivot position.

In accordance with another exemplary embodiment, a method is provided for determining a mass property of an object. The method includes fixing the object to a table centered on a first end of a vertical shaft at a first pivot position, the second end of the vertical shaft being mounted on an inclined shaft extending approximately 54° from vertical; gathering a first torque measurement on the first shaft; pivoting the table from the first pivot position into a second pivot position, the second pivot position being 120° from the first pivot position; gathering a second torque measurement on the first shaft; pivoting the table from the second pivot position into a third pivot position, the third pivot position being 120° from the first pivot position and the second pivot position; gathering a third torque measurement on the first shaft; and calculating the mass property of the object based on the first torque measurement, the second torque measurement, and the third torque measurement

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses of the subject matter described herein. Furthermore, there is no intention to be bound by any expressed or implied theory presented in the preceding technical field, background, brief summary or the following detailed description.

Broadly, exemplary embodiments discussed herein relate to systems and methods for determining mass properties of vehicle components. In one exemplary embodiment, the component to be evaluated is fixed on a table mounted on a vertical shaft coupled to an inclined shaft. Static and/or dynamic torque measurements relative to the inclined shaft are collected. The table is then pivoted about the vertical shaft twice and the static and/or dynamic torque characteristics are observed again in each pivot position. The mass properties may be calculated from these measurements with respect to three axes and without repositioning the component relative to the table. In one exemplary embodiment, the inclined shaft is inclined about 54° from the vertical shaft and the pivot positions are 120° relative to one another.

Figure 1:
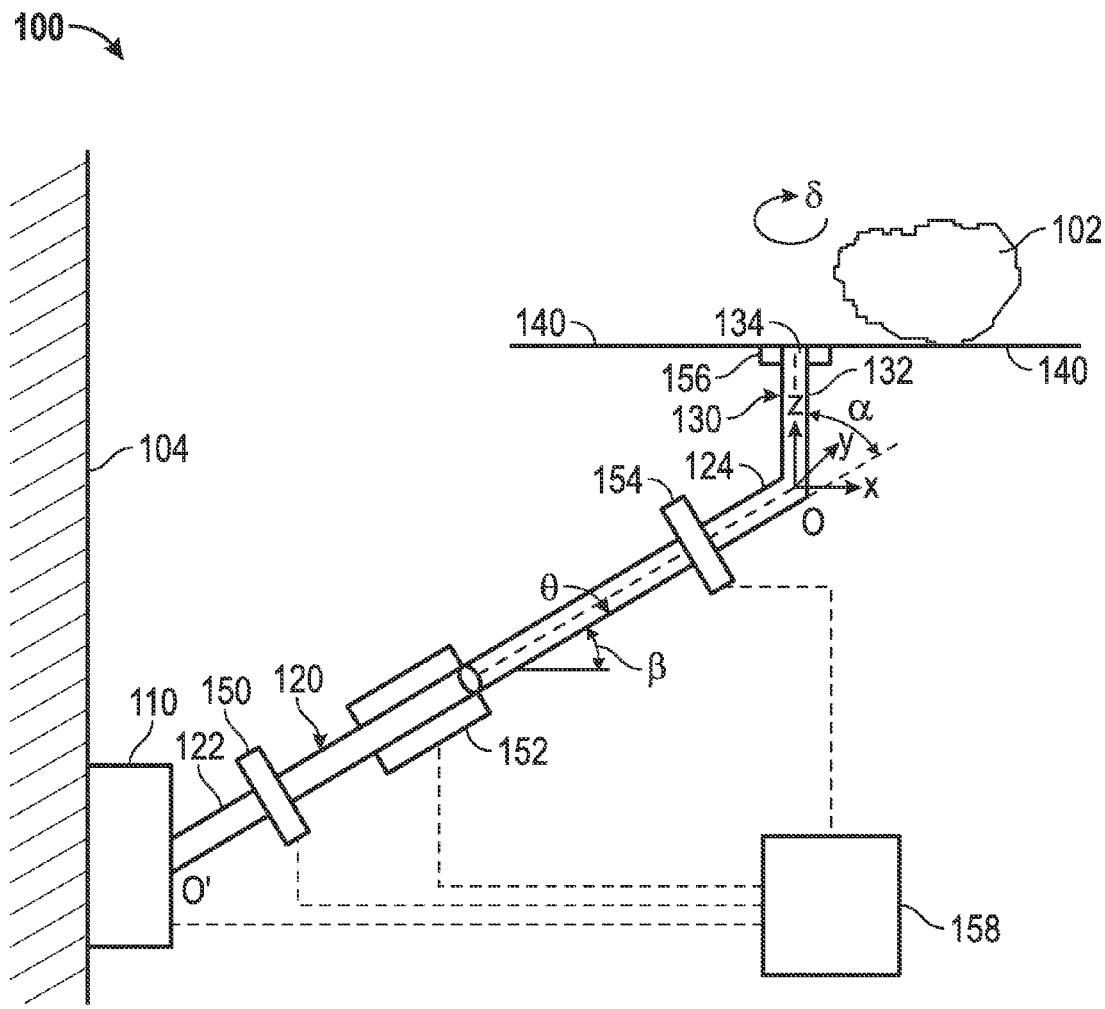
FIG. 1 is a schematic side view of a system for determining mass properties of a vehicle component in accordance with an exemplary embodiment.

FIG. 1 is a schematic side view of a system 100 for determining mass properties of an object in accordance with an embodiment. In one exemplary embodiment, the system 100 may determine or otherwise collect measurements associated with the mass properties of a vehicle component 102, although any type of object or specimen may be evaluated, including an entire vehicle. This information may be used for any suitable purpose, including predicting the total mass of the vehicle early in the design stage as well as providing inputs to dynamic simulations in which inertia properties are important.

As shown in the depicted exemplary embodiment, the system 100 includes a motor 110, a first shaft 120, a second shaft 130, a table 140, a torque sensor 150, air bearings 152, transducers 154, 156, and a controller 158. The system 100 may be mounted on a fixture or housing 104.

The first shaft 120 has a first end 122 and a second end 124. The first end 122 is mounted to the fixture 104, either directly or through the motor 110. The first shaft 120 generally extends at an angle (β) relative to horizontal such that the first shaft 120 may be referred to as the inclined shaft 120. In one exemplary embodiment, the angle (β) relative to horizontal is approximately 35°, or in a more specific exemplary embodiment, approximately 35.27°. As described below, the angle (β) may be the compliment of the angle (α) (e.g., β=90°−α).

As described in greater detail below, the first shaft 120 is configured to be oscillated about a longitudinal axis (labeled O'O) by the motor 110. The angle of oscillation is labeled angle (θ). In general, the oscillating mechanism may be a hydraulic or electromechanical rotary shaker, sized to provide adequate torque to oscillate the first shaft 120.

The second shaft 130 has a first end 132 and a second end 134. The first end 132 of the second shaft 130 is coupled to the second end 124 of the first shaft 120. As shown in the depicted exemplary embodiment, the second shaft 130 generally has a vertical arrangement with a longitudinal axis (labeled OB*). As such, the second shaft 130 is positioned at an angle (α) relative to the first shaft 120. As described in greater detail below, this angle (α) may be, for example, approximately 54°, or in a more specific exemplary embodiment, approximately 54.73°. The angle (α) may be approximately equal to the hypotenuse angle of a cube, e.g., the angle of a cube diagonal relative to a vertical axis.

Figure 2:
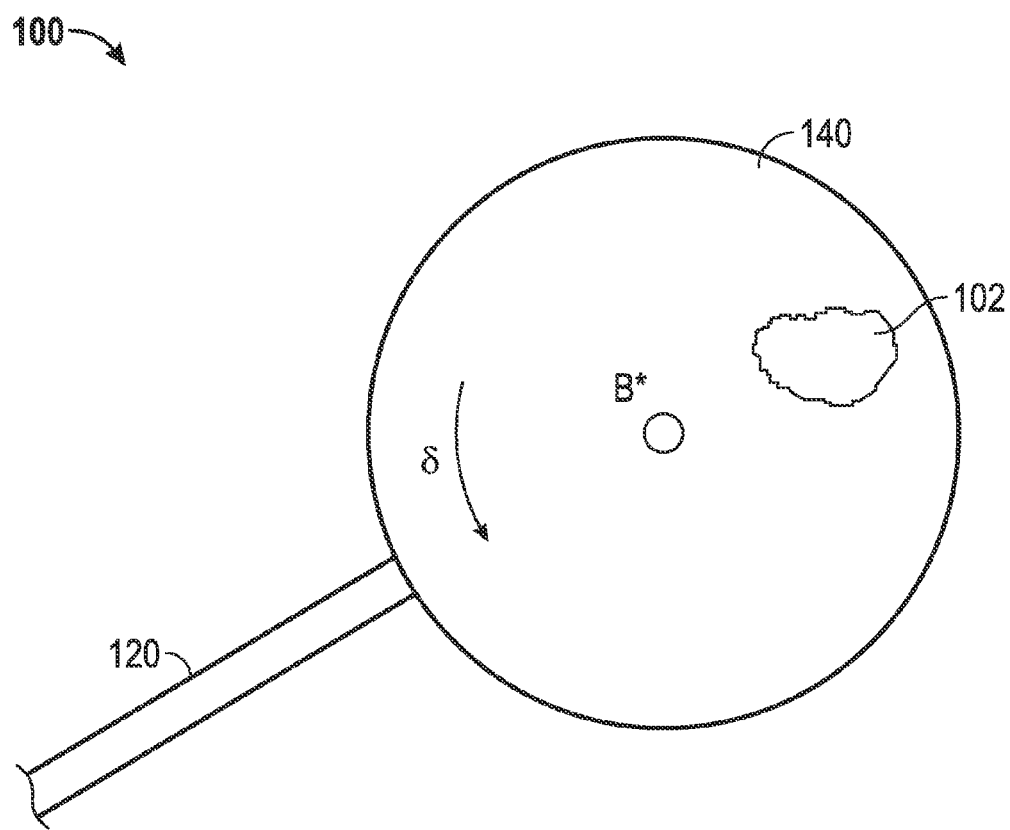
FIG. 2 is a schematic top view of the system of FIG. 1 in accordance with an exemplary embodiment.

The table 140 is mounted on the second end 134 of the second shaft 130. In general, the table 140 may be any surface that supports the component 102 on the second shaft 130. In the depicted exemplary embodiment, the table 140 is arranged in a horizontal plane. Reference is briefly made to FIG. 2, which is a top view of the system 100. As best shown by FIG. 2, in one exemplary embodiment, the table 140 is circular and mounted on the second shaft 130. In the depicted exemplary embodiment, the table 140 is centered about the second shaft 130 at point (B*). As described in greater detail below, the table 140 may be configured to rotate or pivot about point (B*) at an angle (δ). For example, the table 140 may be pivoted by hand or with an actuator (not shown). The vehicle component 102 to be evaluated is supported by and fixed to the table 140. In general, the component 102 may be positioned in any location and orientation on the table 140, and the component 102 maintains the position and orientation relative to the table 140 throughout the evaluation.

Returning to FIG. 1 and as referenced above, the first shaft 120 is inclined relative to the horizontal at angle (β), the second shaft 130 is vertical, and the table 140 is generally horizontal. However, other embodiments may have alternate configurations. For example, the second shaft 130 may be omitted, and the table 140 may be mounted directly on the first shaft 120.

the torque sensor 150 and the first transducer 154 are positioned on or proximate to the first shaft 120. The torque sensor 150 is configured to measure the static torque on the first shaft 120 or the dynamic torque on the first shaft 120 as the first shaft 120 oscillates. The first transducer 154 is configured to measure the angle of oscillation (θ).

The second transducer 156 is mounted on or proximate to the table 140 and is configured to measure the pivot angle (δ) of table 140 relative to the second shaft 130 about point (B*). In one exemplary embodiment, the transducers 154, 156 are rotary variable differential transducers (RVDTs). The air bearings 152 support the first shaft 120 as the first shaft 120 oscillates to reduce friction during measurement. In other embodiments, other types of bearing arrangements may be provided.

The motor 110, torque sensor 150, air bearings 152, and transducers 154, 156 may be coupled to the controller (or processing unit) 158. In general the controller 158 may control operation of the system 100, and more specifically, may also receive measurements from the torque sensor 150 and transducers 154, 156 during operation. For example, the controller 158 may be a processing and/or storage unit that stores the measurements from the torque sensor 150 and transducers 154, 156. The controller 158 may also calculate the mass properties of the vehicle component 102 based on these measurements, as described in greater detail below. In other embodiments, the controller 158 may provide the measurements to a post-processor to calculate the mass properties.

Generally, the controller 158 may include any type of processor or multiple processors, single integrated circuits such as a microprocessor, or any suitable number of integrated circuit devices and/or circuit boards working in cooperation to accomplish the functions of a processing unit. During operation, the controller 158 selectively executes one or more programs that may be stored within memory and, as such, controls the general operation of the system 100. As such, the controller 158 may include, or have access to, any type of memory, including RAM memory, ROM memory, EPROM memory, EEPROM memory, and non-volatile RAM (NVRAM) memory. In general, such memory may store any information needed for the exemplary embodiments discussed herein, including data for the mass property calculations. Although not shown, the controller 158 may include a user interface with a display for providing a graphical representation of the data and results discussed below.

A number of mass properties may be calculated by the system 100, including the moments of inertia (MOI), products of inertia (POI), the principal moments of inertia (PMOI), mass (M), and center of gravity (CG). The mass properties may particularly be determined without repositioning or refixturing the vehicle component 102 relative to the table 140. Further details about the determination of the each of the aforementioned mass properties will be discussed below.

Figure 3:
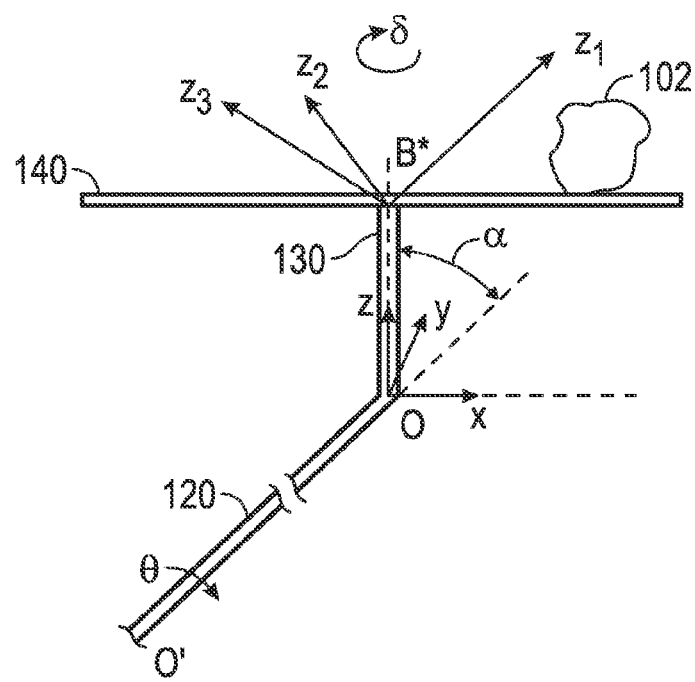
FIG. 3 is a partial schematic side view of the system of FIG. 1 in a first position for calculating moments of inertia in accordance with an exemplary embodiment.
Figure 4:
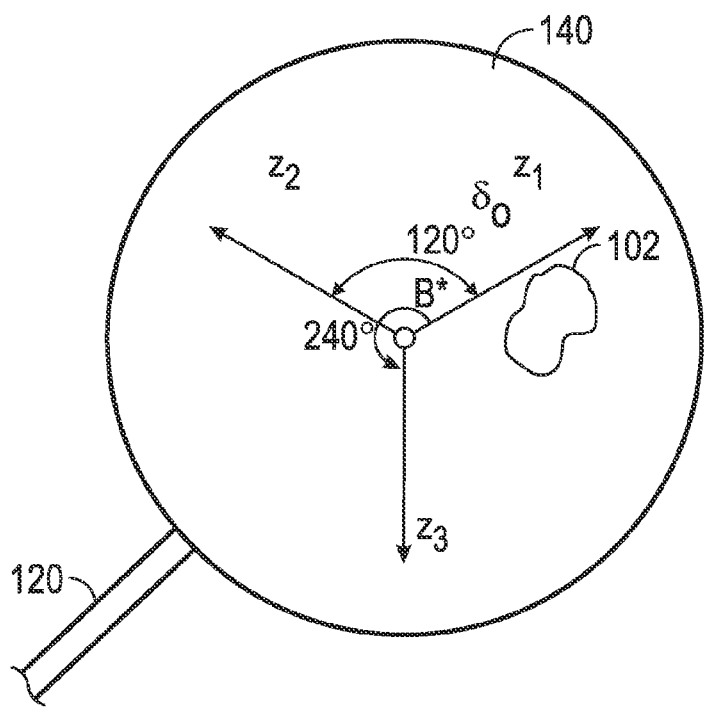
FIG. 4 is a partial schematic top view of the system of FIG. 1 in the first position for calculating moments of inertia in accordance with an exemplary embodiment.
Figure 5:
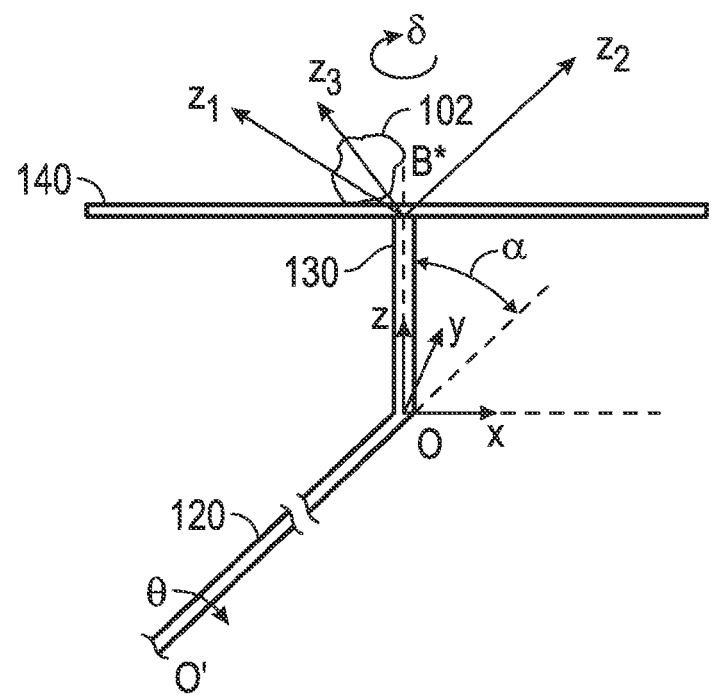
FIG. 5 is a partial schematic side view of the system of FIG. 1 in a second position for calculating moments of inertia in accordance with an exemplary embodiment.
Figure 6:
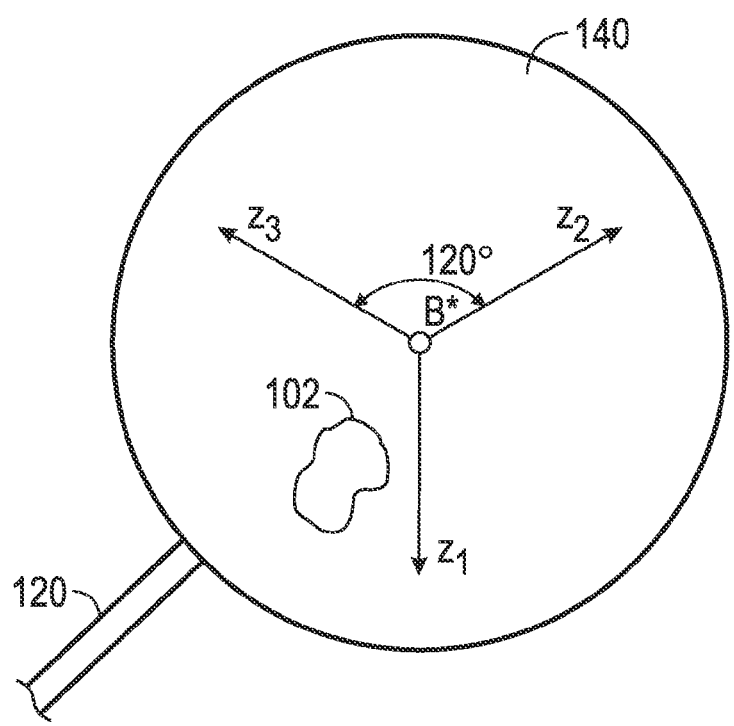
FIG. 6 is a partial schematic top view of the system of FIG. 1 in the second position for calculating moments of inertia in accordance with an exemplary embodiment.
Figure 7:
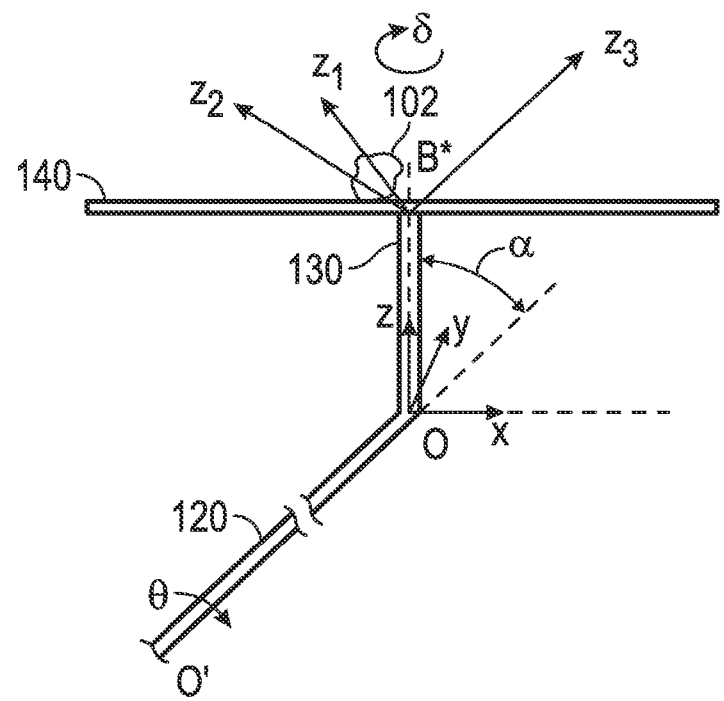
FIG. 7 is a partial schematic side view of the system of FIG. 1 in a third position for calculating moments of inertia in accordance with an exemplary embodiment.
Figure 8:
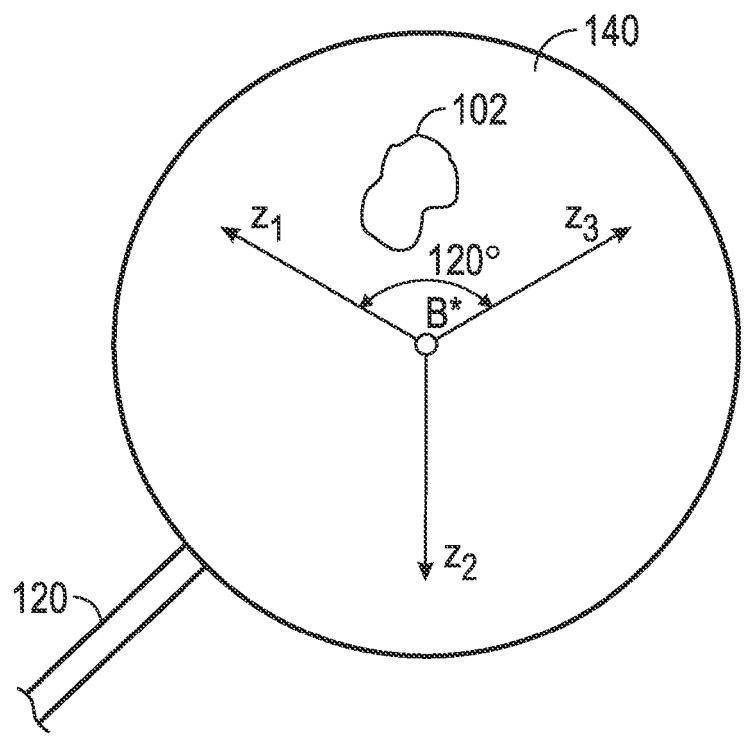
FIG. 8 is a partial schematic top view of the system of FIG. 1 in the third position for calculating moments of inertia in accordance with an exemplary embodiment.

In general, the moment of inertia refers to the rotational inertia of the vehicle component 102 with a specific rotation axis, e.g., the vehicle component 102 has a moment of inertia with respect to three orthogonal axes. FIGS. 3-8 are partial schematic diagrams used for describing the orientation of the system 100 in different positions. For example, FIG. 3 and FIG. 4 are side and top views, respectively, showing the first shaft 120, the second shaft 130, and the table 140 in an initial position. The initial position refers to the initial pivot position ($\delta=\delta_0$) of the table 140 about axis (OB*). FIG. 5 and FIG. 6 are side and top views, respectively, showing the first shaft 120, the second shaft 130, and the table 140 in a second pivot position ($\delta=\delta_0+120°$). The second position is 120° from the initial position. Similarly, FIG. 7 and FIG. 8 are side and top views, respectively, showing the first shaft 120, the second shaft 130, and the table 140 in a third pivot position ($\delta=\delta_0+240°$). The third position is 120° from the second position and 240° from the initial position (or −120° from the initial position).

A first coordinate system (xyz) for consideration has been superimposed in FIG. 1 on the system 100 at point (O). The xy-plane is horizontal and the z-axis is vertical. FIGS. 3-8 illustrate the superposition of an alternate, second coordinate system ($z_1$, $z_2$, $z_3$) superimposed on the system 100 at point (B*) on the table 140. The second coordinate system ($z_1$, $z_2$, $z_3$) is arranged to have a respective axis parallel to the longitudinal axis (O'O) of the first shaft 120. For example, in FIG. 3, a first axis ($z_1$) of the second coordinate system ($z_1$, $z_2$, $z_3$) is parallel to the longitudinal axis (O'O) of the first shaft 120. In FIG. 5, a second axis ($z_2$) of the second coordinate system ($z_1$, $z_2$, $z_3$) is parallel to the longitudinal axis (O'O) of the first shaft 120. In FIG. 7, a third axis ($z_3$) of the second coordinate system ($z_1$, $z_2$, $z_3$) is parallel to the longitudinal axis (O'O) of the first shaft 120. Additional details about the orthogonal nature of the coordinate system ($z_1$, $z_2$, $z_3$) will be provided below.

Given that the axes of the second coordinate system ($z_1$, $z_2$, $z_3$) are orthogonal to one another, the first, second, and third axes ($z_1$, $z_2$, $z_3$) may be arranged to be parallel to the to the longitudinal axis (O'O) of the first shaft 120 by rotating the table 120 between the pivot positions, e.g., by rotating the table 120 from 0°, to 120°, and to 240°, and without refixturing the vehicle component 102 relative to the table 140.

Figure 9:
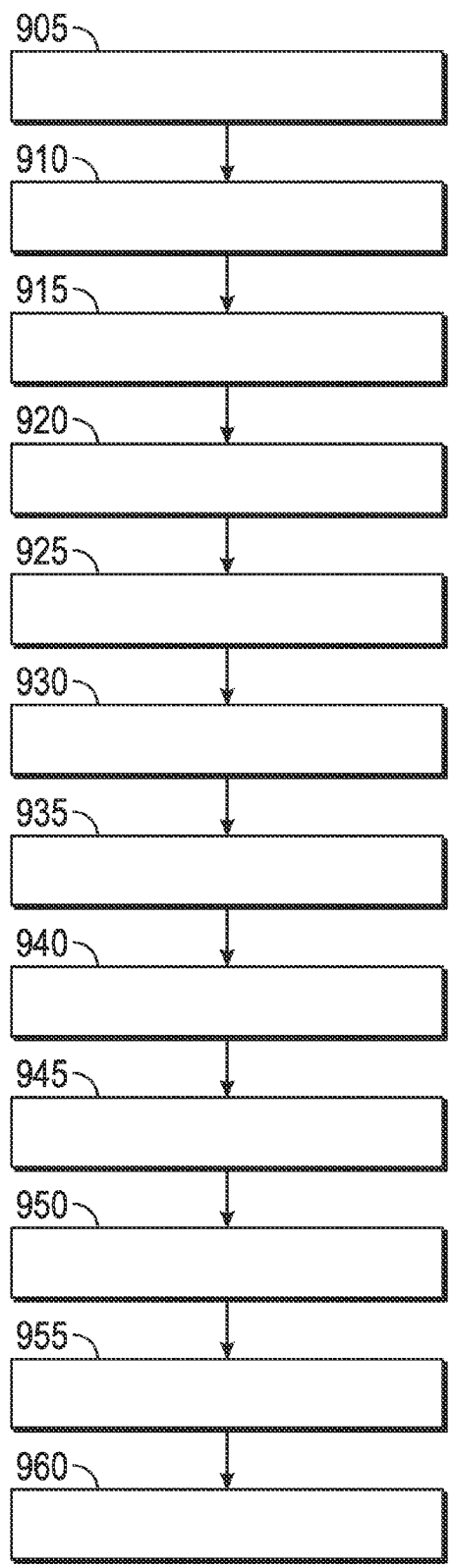
FIG. 9 is a flowchart of a method for determining moments of inertia of a vehicle component in accordance with an exemplary embodiment.

To summarize the manner in which the structure described in FIGS. 1-8 may be used in the context of the present disclosure, FIG. 9 is a flowchart of a method 900 for determining the moments of inertia of a vehicle component. The method 900 may be implemented with system 100 and component 102. As such, FIGS. 1-9 are referenced below.

In a first step 905, the component 102 is fixed to the table 140 of system 100, and the first shaft 120 is considered parallel to the first axis ($z_1$) of the coordinate system ($z_1$, $z_2$, $z_3$), as particularly shown in FIG. 3. The table 140 has an initial pivot position ($\delta=\delta_0$), as particularly shown in FIG. 4. In a step 910, the system 100 (e.g., the shaft 130, table 140, and component 102) is oscillated about the first shaft 120. In a step 915, dynamic torque measurements from the torque sensor 150 and angular acceleration measurements from the transducer 154 are gathered. In a step 920, these measurements are used to calculate the moment of inertia about the first axis ($z_1$).

In a step 925, the table 120 may be pivoted into the second pivot position) ($\delta=\delta_0+120°$) shown by FIGS. 5 and 6 such that the second axis ($z_2$) is parallel to the first shaft 120. In a step 930, the system 100 is oscillated about the first shaft 120. In a step 935, measurements from the torque sensor 150 and transducer 154 are gathered. In a step 940, these measurements are used to calculate the moment of inertia about the second axis ($z_2$).

In a step 945, the table 120 may be pivoted into the second pivot position) ($\delta=\delta_0+240°$) shown by FIGS. 7 and 8 such that the third axis ($z_3$) is parallel to the first shaft 120. In a step 950, the system 100 is oscillated about the first shaft 120. In a step 955, measurements from the torque sensor 150 and transducer 154 are gathered (e.g., sampled and saved for subsequent processing). In a step 960, these measurements are used to calculate the moment of inertia about the third axis ($z_3$) such that a complete set of the moments of inertia for the vehicle component 102 are obtained. A more detailed description of the moment of inertia calculation is provided below.

In general, the moment of inertia is evaluated by measuring the dynamic torque and angular acceleration of the system 100 about the first shaft 120, as expressed by Equation (1).

$$\Gamma = \Gamma_g I \ddot{\Theta} \qquad \text{Eq. (1)}$$

wherein $\Gamma$ is the total dynamic torque of the system;

$\Gamma_g$ is gravity torque (due to CG being offset from the axis of rotation);

I is the moment of inertia about the axis of rotation for the system; and $\ddot{\Theta}$ is the angular acceleration.

In one exemplary embodiment, it may be advantageous to minimize the gravity torque ($\Gamma_g$) and maximize the angular acceleration ($\ddot{\Theta}$). This may be accomplished by initially tilting the system 100 to a particular value of angular position ($\theta$) such that the system is balanced, e.g., the gravity torque ($\Gamma_g$) is at or near zero, and oscillating about this balance point with only small displacements at a relatively high frequency, thus resulting in a maximized angular acceleration ($\ddot{\Theta}$). In these conditions, Equation (1) may be simplified as Equation (2).

$$I_U = \frac{1}{X} \sum_{n=1}^{X} \left| \frac{\Gamma_n}{\ddot{\Theta}_n} \right| \qquad \text{Eq. (2)}$$

wherein $I_U$ is the calculated moment of inertia about the axis of rotation for the system over a series of data points (x);

$\Gamma_n$ is the total dynamic torque of the system for a respective data point; and $\ddot{\Theta}_n$ is the angular acceleration for a respective data point.

Accordingly, the total moment of inertia ($I_U$) includes the central moment of inertia of the system about a parallel axis (e.g., $z_1$, $z_2$, or $z_3$) passing through the system center of gravity and the parallel axis term ($Md^2$), wherein the term (M)

is the total mass of the system and the term (d) is the minimum distance (e.g., the perpendicular distance) between the a parallel axis (e.g., $z_1$, $z_2$, or $z_3$) and axis (O'O). As such, the moments of inertia for the vehicle component 102 may be determined by subtracting the tare terms (e.g., the unloaded system inertia) from the respective total moments of inertia, as expressed by Equation (3).

$$I_{Zn} = \left| \frac{\Gamma_{Zn}}{\ddot{\Theta}_{Zn}} \right| - I_{U\_TARE\_Zn} \qquad \text{Eq. (3)}$$

wherein $I_{Zn}$ is the moment of inertia for the vehicle component about the respective axis ($z_1$, $z_2$, or $z_3$);

$\Gamma_{Zn}$ is the total dynamic torque of the system about the respective axis ($z_1$, $z_2$, or $z_3$);

$\ddot{\Theta}_{Zn}$ is the angular acceleration about the respective axis ($z_1$, $z_2$, or $z_3$); and $I_{U\_TARE\_Zn}$ is the moment of inertia for the unloaded system about the respective axis ($z_1$, $z_2$, or $z_3$).

Accordingly, when the system 100 is oscillated, the torque sensor 150 measures the total dynamic torque ($\Gamma_{Zn}$) at the first shaft 120, and the transducer 154 provides information about the angle (θ) of oscillation from which the angular acceleration ($\ddot{\Theta}_{Zn}$) may be calculated. Based on these values, the controller 158 may calculate the moment of inertia (I) for a respective axis (e.g., $z_1$) and upon pivoting of the table 140, repeat the measurements for calculation of the other two axes (e.g. $z_2$ and $z_3$), as noted above, thus resulting the moment of inertia ($I_{z1}$, $I_{z2}$, $I_{z3}$) from the three sets of dynamic torque measurement ($\Gamma_{Z1}$, $\Gamma_{Z2}$, $\Gamma_{Z3}$) and position measurements ($\ddot{\Theta}_{Z1}$, $\ddot{\Theta}_{Z2}$, $\ddot{\Theta}_{Z3}$).

Figure 10:
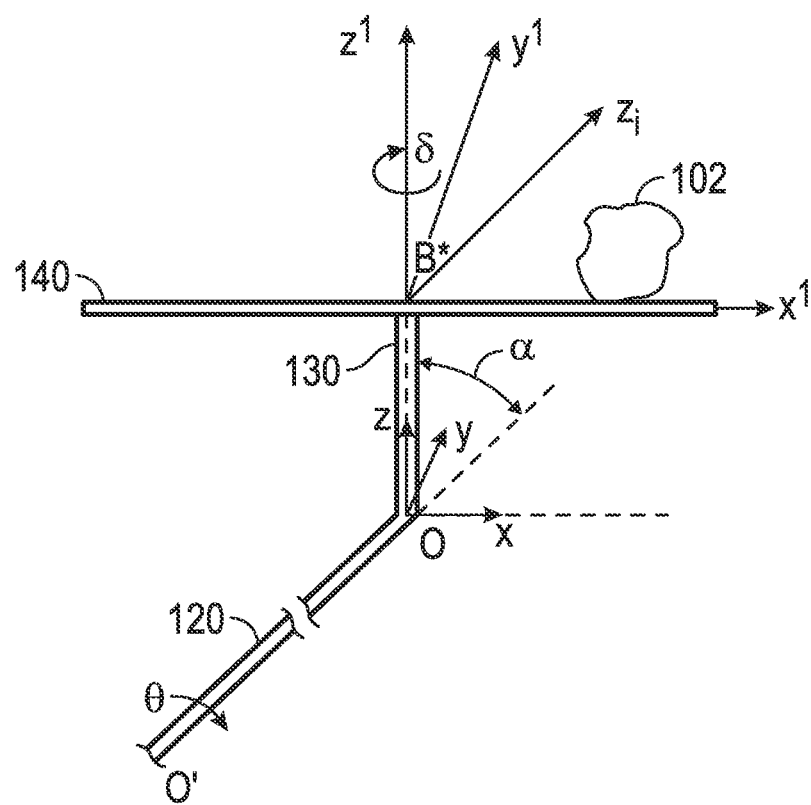
FIG. 10 is a partial schematic side view of the system of FIG. 1 for describing the determination of products of inertia in accordance with an exemplary embodiment.

As noted above, the system 100 may also evaluate the products of inertia (POI), which may be used to measure and compute the dynamic imbalance of a specimen, such as vehicle component 102. Equation (4) is used to evaluate the products of inertia.

$$I_{zi} = l_i^2 \cdot I_{x'} + m_i^2 \cdot I_{y'} + n_i^2 \cdot I_{z'} - 2l_i \cdot m_i \cdot I_{x'y'} - 2l_i \cdot n_i \cdot I_{x'z'} - 2m_i \cdot n_i \cdot I_{y'z'} \qquad \text{Eq. (4)}$$

wherein $I_{x'}$, $I_{y'}$, $I_{z'}$ are moments of inertia about x', y', z' axes, respectively;

$I_{x'y'}$, $I_{x'z'}$, $I_{y'z'}$ are products of inertia in the x', y', z' coordinate system; and $I_{zi}$ is the $i^{th}$ inertia about an arbitrary axis $z_i$ having direction cosines $l_i$, $m_i$, and $n_i$ from the x', y', z' axes, respectively FIG. 10 illustrates the relationship between the x', y', z' axes and the $z_i$ axis. As shown, the x', y', z' axes are three orthogonal axes with an origin (B*) and parallel to the x, y, z axes with an origin (O). The products of inertia ($I_{x'y'}$, $I_{x'z'}$, $I_{y'z'}$) and moments of inertia ($I_{x'}$, $I_{y'}$, $I_{z'}$) may be determined by measuring six moments of inertia about an arbitrary axis ($z_i$) having direction cosines ($l_i$, $m_i$, $n_i$) from x', y', z' axis, respectively.

Figure 11:
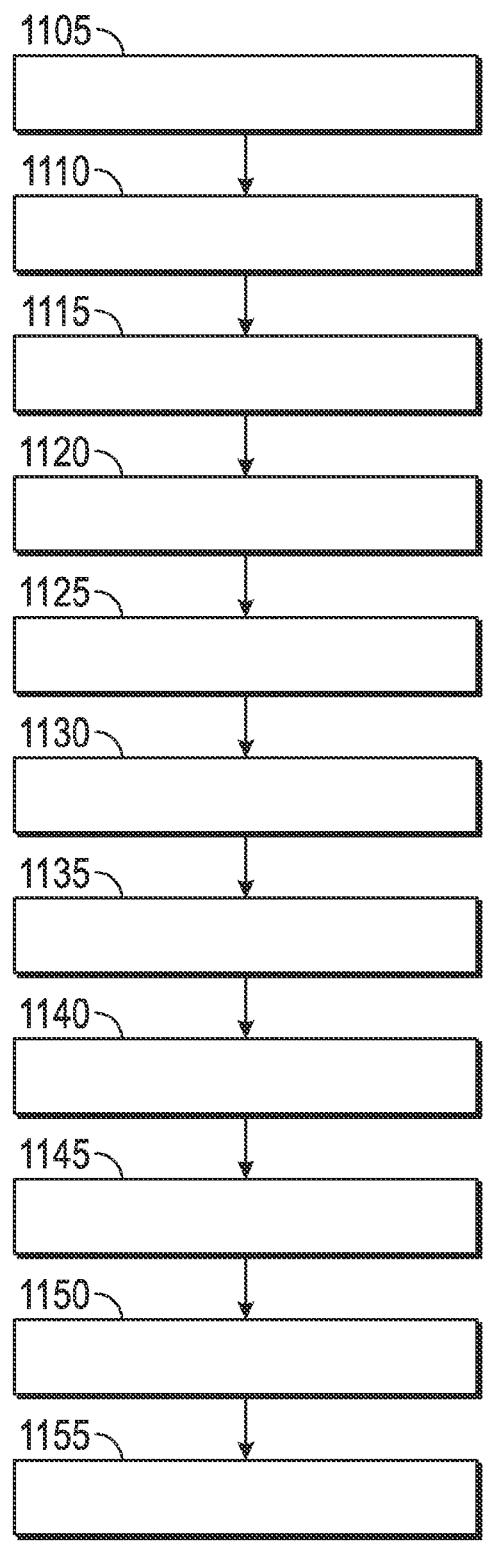
FIG. 11 is a flowchart of a method for determining products of inertia of a vehicle component in accordance with an exemplary embodiment.

To summarize an exemplary embodiment, FIG. 11 is a flowchart of a method 1100 for determining the products of inertia of a vehicle component. The method 1100 may be implemented with system 100. As such, FIGS. 1, 10, and 11 are referenced below.

In a first step 1105, the component 102 is fixed to the table 140 of system 100. In a step 1110, measurements associated with moments of inertia are calculated as discussed above in method 900 of FIG. 9. In a step 1115, the table 140 is pivoted to an arbitrary angle ($\delta_n$) such that the first shaft 120 is parallel to an arbitrary axis ($z_i = z_{n1}$). In a step 1120, the system 100 is oscillated about the first shaft 120. In a step 1125, measurements from the torque sensor 150 and transducer 154 are gathered (e.g., sampled and saved for subsequent processing). In a step 1130, the table 120 may be pivoted into a second pivot position ($\delta_n + 120°$). In a step 1135, the system 100 is oscillated about the first shaft 120. In a step 1140, measurements from the torque sensor 150 and transducer 154 are gathered. In a step 1145, the table 120 may be pivoted into a third pivot position) ($\delta_n + 240°$). In a step 1150, the system 100 is oscillated about the first shaft 120. In a step 1155, the resulting measurements and moments of inertia ($I_{x'}$, $I_{y'}$, $I_{z'}$) are used in Equation (4) to calculate the products of inertia ($I_{x'y'}$, $I_{x'z'}$, $I_{y'z'}$). The accuracy of measurement may be improved by making additional sets of measurements.

As noted above, the system 100 may also evaluate the principal moments of inertia (PMI) of a specimen, such as vehicle component 102, using the values calculated in method 1100 of FIG. 11. In general, the principal moments of inertia (PMI) may be considered the set of inertia vales about three mutually perpendicular axes in which the products of inertia are zero. In one exemplary embodiment, the principal moments of inertia may be estimated by using an ellipsoid of inertia and/or an eigen-value technique.

The general equation for an ellipsoid of inertia for a given moment of inertia and product of inertia may be expressed by Equation (5):

$$I_{x'} x'^2 + I_{y'} y'^2 + I_{z'} y'^2 + I_{z'} z'^2 - 2I_{x'y'} x'y' - 2I_{x'z'} x'z' - 2I_{y'z'} y'z' = 1 \qquad \text{Eq. (5)}$$

wherein $I_{x'}$, $I_{y'}$, $I_{z'}$ are moments of inertia about x', y', z' axes, respectively;

$I_{x'y'}$, $I_{x'z'}$, $I_{y'z'}$ are products of inertia in the x', y', z' coordinate system; and x', y', z' are the principal diameters of the ellipsoid of inertia and correspond to the principal moments of inertia.

Accordingly, the moments of inertia ($I_{y'}$, $I_{y'}$, $I_{z'}$) and the products of inertia ($I_{x'y'}$, $I_{x'z'}$, $I_{y'z'}$) may be determined as described above, and Equation (5) may be used to solve for the principal moments of inertia (x', y', z').

As noted above, the principal moments of inertia may also be estimated by solving the determinant represented by Equation (6).

$$\begin{vmatrix} |P - I_{x'}| & I_{x'y'} & I_{x'z'} \\ I_{x'y'} & |P - I_{y'}| & I_{y'z'} \\ I_{x'z'} & I_{y'z'} & |P - I_{z'}| \end{vmatrix} = 0 \qquad \text{Eq. (6)}$$

wherein $I_{x'}$, $I_{y'}$, $I_{z'}$ are moments of inertia about x', y', z' axes, respectively; and $I_{x'y'}$, $I_{x'z'}$, $I_{y'z'}$ are products of inertia in the x', y', z' coordinate system.

An expansion of the determinant of Equation (6) provides a cubic equation with |P. Solving for three roots (|P_1, |P_2, |P_3) provides the principal moments of inertia.

In addition to the mass properties discussed above, the system 100 may be used to measure the mass and center of gravity of a specimen, such as the vehicle component 102. The capability to measure mass and the center of gravity with system 100 may be advantageous in that it reduces unnecessary handling of the vehicle component 102.

In principle, the system 100 measures the mass moment vector with the torque sensor 150 at the first shaft 120 for different combinations of angular positions (θ) and pivot positions (δ) at static conditions. The calculation of the mass and center of gravity will be described with reference to FIG. 12, which illustrates the component 102 positioned on table 140 at a distance (r) from an origin (O). The mass moment vector (mgr) is the weight (mg) of the vehicle component 102 multiplied by the distance (r) from the origin (O) to the center of gravity. Each measurement set includes samples of static torque along the (OO') axis and samples of static angular positions (θ) and pivot positions (δ).

Figure 12:
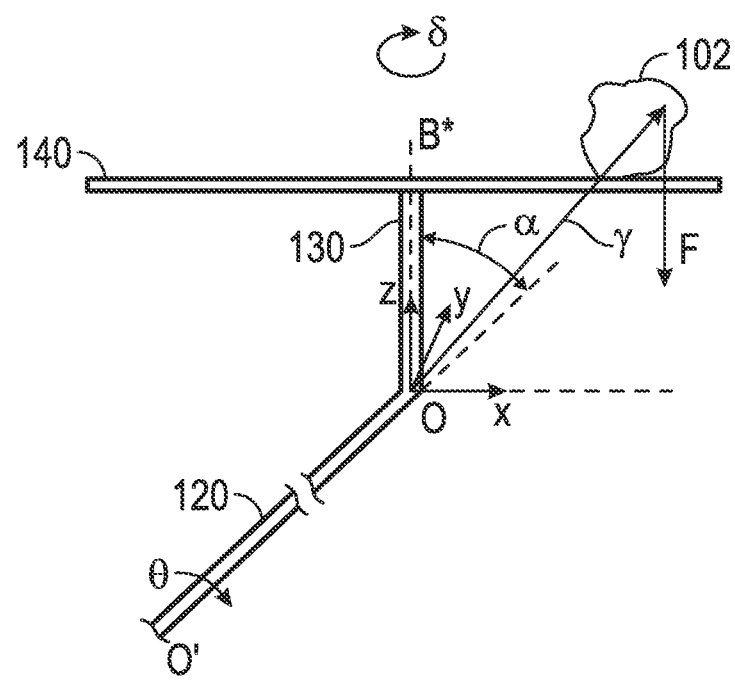
FIG. 12 is a partial schematic side view of the system of FIG. 1 for describing the determination of mass and center of gravity in accordance with an exemplary embodiment.
Figure 13:
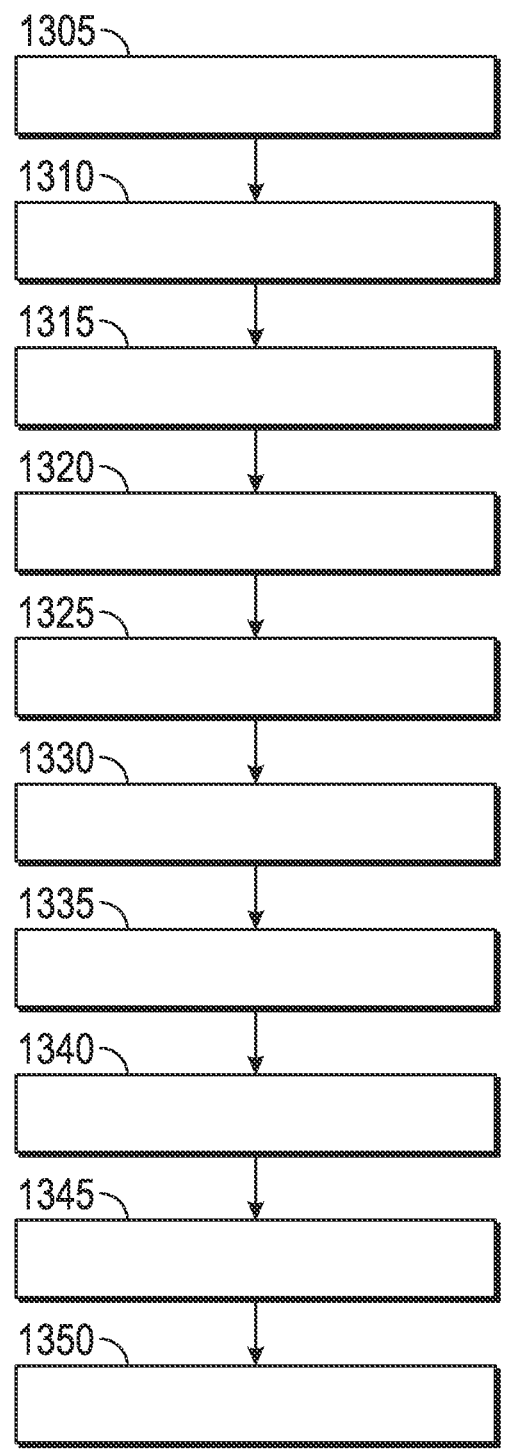
FIG. 13 is a flowchart of a method for determining mass and center of gravity of a vehicle component in accordance with an exemplary embodiment.

To summarize an exemplary embodiment, FIG. 13 is a flowchart of a method 1300 for determining the mass and center of gravity of a vehicle component. The method 1300 may be implemented with system 100. As such, FIGS. 1, 12, and 13 are referenced below.

In a first step 1305, the component 102 is fixed to the table 140 of system 100. In a step 1310, the static torque ($T_1$) is measured at a first pivot position ($δ=δ_0$) and a first fixed angular position (θ=0°). In a step 1315, the table 140 is rotated to a second pivot position ($δ_1$), and in a step 1320, the static torque ($T_2$) is measured at the second pivot position ($δ_1$) and first fixed angular position (θ=0°). In a step 1325, the table 140 is rotated to a third pivot position ($δ_2$), and in a step 1330, the static torque ($T_3$) is measured at the third pivot position ($δ_2$) and first fixed angular position (θ=0°). In a step 1335, the table 140 is rotated to the first pivot position ($δ_0$). In step 1340, the shaft 120 is rotated to a second fixed angular position (θ=$θ_1$), and in step 1345, the static torque ($T_4$) is measured at the first pivot position ($δ_0$) and second fixed angular position (θ=$θ_1$). In step 1350, the mass and center of gravity may be calculated from the four static torque measurements ($T_1$, $T_2$, $T_3$, $T_4$), as discussed in greater detail below.

Mathematical expressions may be written for each torque measurement using a vector approach. Referring to FIG. 12, the center of gravity for the total system and specimen (M) is at position (O) in coordinate system (x, y, z) when the angular position (θ) and pivot position (δ) are at 0° and 0°, respectively. The unit vectors along the x, y, z axes may be referenced below as $\hat{i}$, $\hat{j}$, and $\hat{k}$, respectively.

Referring to Equation (7) below, the mass moment vector ($\vec{T}$) at point (O) for a given position vector ($\vec{r}$) and a force vector ($\vec{F}$) may be estimated by a vector product of ($\vec{r}$) and ($\vec{F}$), as expressed by Equation (7).

$$\vec{T} = \vec{r} \otimes \vec{F} \qquad \text{Eq. (7)}$$

wherein $\vec{r} = x\hat{i} + y\hat{j} + z\hat{k}$; and $\vec{F} = -Mg\hat{k}$

As such, Equation (7) may be expressed as follows in Equation (8).

$$\vec{T} = (x\hat{i} + y\hat{j} + z\hat{k}) \otimes (-Mg\hat{k}) \qquad \text{Eq. (8)}$$

Equation (8) may be simplified as follows in Equation (9).

$$\vec{T} = Mg(y\hat{i} - x\hat{j}) \qquad \text{Eq. (9)}$$

The torque ($T_U$) measured by the torque sensor 150 on the first shaft 120 may be expressed as follows in Equation (10).

$$T_U = \frac{\vec{T} \cdot \vec{U}}{|\vec{U}|} \qquad \text{Eq. (10)}$$

wherein $T_U$ is the measured torque on the first shaft;

$\vec{T}$ is the mass moment vector; and $\vec{U}$ is the unit vector along the shaft axis.

The unit vector ($\vec{U}$) along the shaft axis may be expressed as follows in Equation (11).

$$\vec{U} = \frac{1}{\sqrt{3}}(\hat{i} + \hat{j} + \hat{k}) \qquad \text{Eq. (11)}$$

Combining Equations (10) and (11) yields Equation (12).

$$T_U = \vec{T} \frac{1}{\sqrt{3}}(\hat{i} + \hat{j} + \hat{k}) \qquad \text{Eq. (12)}$$

Combing Equations (9) and (12) yields Equation (13).

$$T_U = \frac{Mg}{\sqrt{3}}(y - x) \qquad \text{Eq. (13)}$$

As such, the four torque measurements may be expressed as follows in Equations (14)-(17).

$$T_1 = \frac{Mg}{\sqrt{3}}(y - x) \qquad \text{Eq. (14)}$$

$$T_2 = \frac{Mg}{\sqrt{3}}(y_1 - x_1) \qquad \text{Eq. (15)}$$

$$T_3 = \frac{Mg}{\sqrt{3}}(y_2 - x_2) \qquad \text{Eq. (16)}$$

$$T_4 = \frac{Mg}{\sqrt{3}}(y_3 - x_3) \qquad \text{Eq. (17)}$$

Accordingly, in Equations (14)-(17), the points (x, y), ($x_1$, $y_1$), ($x_2$, $y_2$), and ($x_3$, $y_3$) are the coordinates of the center of gravity of the system 100 at (θ=0°, δ=$δ_0$), (0°, $δ_1$), (0°, δ2), and ($θ_1$, $δ_0$), which may be normalized in an (x, y, z) coordinate system. Solving Equations (14)-(17) for the four unknowns (M, x, y, z) provides the mass (M) and the center of gravity (x, y, z) of the system 100.

Now referring to Equations (18)-(21) below, the center of mass ($x_{SC}$, $y_{SC}$, $z_{SC}$) of the component 102 and mass ($M_{SC}$) of the component 102 may be determined from the mass of the system 100 (M or $M_{tot}$) loaded with the component 102 and the mass of the system 100 ($M_{tar}$) without the component 102.

$$M_{SC} = M_{tot} - M_{tar} \qquad \text{Eq. (18)}$$

$$x_{SC} = \frac{M_{tot} \cdot x_{tot} - M_{tar} \cdot x_{tar}}{M_{SC}} \qquad \text{Eq. (19)}$$

$$y_{SC} = \frac{M_{tot} \cdot y_{tot} - M_{tar} \cdot y_{tar}}{M_{SC}} \qquad \text{Eq. (20)}$$

$$z_{SC} = \frac{M_{tot} \cdot z_{tot} - M_{tar} \cdot z_{tar}}{M_{SC}} \qquad \text{Eq. (21)}$$

wherein $M_{SC}$, $M_{tot}$, $M_{tar}$ are the mass of the component, loaded system, and unloaded system, respectively;

$x_{SC}$, $y_{SC}$, $z_{SC}$ are the coordinates of the center of gravity of the component;

$x_{tot}$, $y_{tot}$, $z_{tot}$ are the coordinates of the center of gravity of the loaded system; and $x_{tar}$, $y_{tar}$, $z_{tar}$ are the coordinates of the center of gravity of the unloaded system.

In Equations (18)-(21), the unloaded system 100 includes all of the components of the system 100 discussed above, as well as any additional elements, fixtures and accessories that may be integrated with the component 102 during measurement of the total, loaded system 100. Accordingly, the system 100 enables the determination of the mass and center of gravity of the vehicle component 102 without refixturing and reconfiguring the component 102 relative to the system 100.

As noted above, the description of the system 100 above assumed that the axes ($z_1$, $z_2$, $z_3$) were orthogonal to one another. An explanation of a vector analysis demonstrating the orthogonal nature of the axes ($z_1$, $z_2$, $z_3$) is provided below with reference to FIG. 14, which is a schematic representation of the table 140 of FIG. 1.

Figure 14:
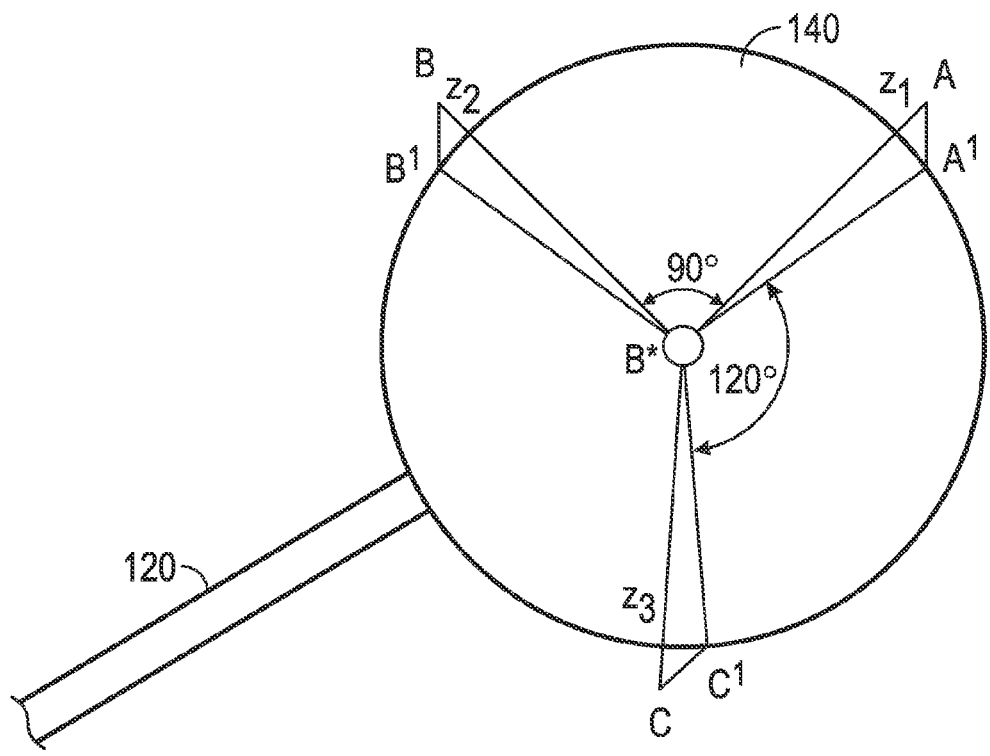
FIG. 14 is a partial schematic top view of the system of FIG. 1 for describing the orthogonal axes used to calculate the moments of inertia in accordance with an exemplary embodiment.
Figure 14:
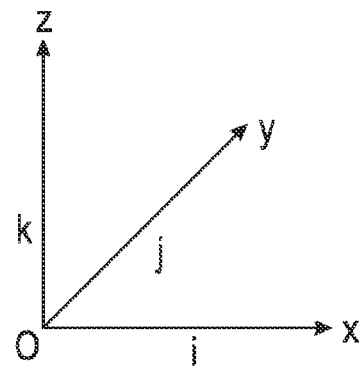

In particular, FIG. 14 illustrates axes ($z_1$, $z_2$, $z_3$) represented as vectors (B*A), (B*B), and (B*C) parallel to the first shaft 120 when the table 140 is pivoted to pivot positions ($\delta_0$), ($\delta_0$+120°), and ($\delta_0$+240°), respectively. The projection of axes ($z_1$, $z_2$, $z_3$) on the plane of the table 140 is represented by vectors (B*A$^1$), (B*B$^1$), and (B*C$^1$), which are placed 120° relative to one another.

If the axes ($z_1$, $z_2$, $z_3$) are orthogonal to one another, the following conditions should apply:

$$(B^*A) \cdot (B^*B) = 0$$

$$(B^*A) \cdot (B^*C) = 0$$

$$(B^*C) \cdot (B^*B) = 0$$

angle between (B*A) and (B*B)=90°
angle between (B*A) and (B*C)=90°
angle between (B*C) and (B*B)=90°

Because the vector (B*A) is parallel to the first shaft 120, the vector (B*A) may be expressed as follows in Equation (22).

$$B^*A = \alpha \hat{i} + \alpha \hat{j} + \alpha \hat{k} \qquad \text{Eq. (22)}$$

Therefore, the projection of B*A onto the table 140 may be represented as follows by Equation (23).

$$B^*A^1 = \alpha \hat{i} + \alpha \hat{j} \qquad \text{Eq. (23)}$$

The vector (B*A$^1$) may be rotated by 120° to determine vector (B*B$^1$), as represented by Equation (24)

$$B^*B^1 = \sqrt{2} \cdot \alpha (\cos 165 \hat{i} + \sin 165 \hat{j}) \qquad \text{Eq. (24)}$$

Since vector (B*B$^1$) is the projection of vector (B*B) onto table 140, vector B*B may be expressed as follows in Equation (25).

$$B^*B = \sqrt{2} \cdot \alpha (\cos 165 \hat{i} + \sin 165 \hat{j}) + \alpha \hat{k} \qquad \text{Eq. (25)}$$

Similarly, vectors (B*C$^1$) and (B*C) may be expressed as follows in Equations (26) and (27).

$$B^*C^1 = \sqrt{2} \cdot \alpha (\cos 285 \hat{i} + \sin 285 \hat{j}) \qquad \text{Eq. (26)}$$

$$B^*C = \sqrt{2} \cdot \alpha (\cos 285 \hat{i} + \sin 285 \hat{j}) + \alpha \hat{k} \qquad \text{Eq. (27)}$$

The angle between vectors (B*A) and (B*B) may be expressed as follows Equations (28) and (29).

$$(B^*A) \cdot (B^*B) = |B^*A| \cdot |B^*B| \cdot \cos(\phi) \qquad \text{Eq. (28)}$$

$$\cos(\phi) = \frac{(B^*A) \cdot (B^*B)}{|B^*A| \cdot |B^*B|} \qquad \text{Eq. (29)}$$

wherein $\phi$ is the angle between vectors (B*A) and (B*B); and
|B*A| and |B*B| are the magnitudes of vectors (B*A) and (B*B).

As such, using Equations (22) and (25), Equation (29) may be solved as shown in Equations (30) and (31).

$$\cos(\phi) = \frac{[\sqrt{2} \cdot (-\cos 15 + \sin 15) + 1]}{3} = 0 \qquad \text{Eq. (30)}$$

$$\phi = \cos^{-1} 0 = 90° \qquad \text{Eq. (31)}$$

Thus, the vectors (B*A) and (B*B) satisfy the conditions discussed above, and the axes ($z_1$) and ($z_2$) are orthogonal. Similar proofs may be provided for the vectors (B*B) and (B*C) and vectors (B*C) and (B*A) to illustrate that axes ($z_2$) and ($z_3$) and axes ($z_3$) and ($z_1$) are orthogonal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for measuring a mass property of an object, comprising:
   a first shaft having a first end and a second end;
   a table disposed in a first plane and coupled to the first shaft at a predetermined angle to support the object, wherein the table is configured to pivot about an axis perpendicular to the first plane between at least a first pivot position and a second pivot position, wherein the first plane is generally horizontal and the first shaft is inclined relative to the table at the predetermined angle; and
   a torque sensor configured to collect a first torque measurement on the first shaft when the table is in the first pivot position and a second torque measurement on the first shaft when the table in the second pivot position.

2. The system of claim 1, wherein the first end of the first shaft is mounted on a fixture, and wherein the system further comprises a second shaft coupling the second end of the first shaft to the table.

3. The system of claim 2, wherein the second shaft has a vertical orientation.

4. The system of claim 3, wherein the predetermined angle is about 54° from a vertical axis.

5. The system of claim 3, wherein the table is configured to pivot into a third pivot position, wherein the torque sensor is configured to collect a third torque measurement on the first shaft when the table is in the third pivot position.

6. The system of claim 5, wherein the second pivot position is 120° from the first pivot position and the third pivot position is 120° from the second pivot position.

7. The system according to claim 6, further comprising a controller coupled to the torque sensor and configured to calculate the mass property of the object based on the first torque measurement, the second torque measurement, and the third torque measurement.

8. The system of claim 7, further comprising a motor coupled to the first shaft configured to oscillate the first shaft, the second shaft, and the table about a longitudinal axis of the first shaft, wherein the torque sensor is configured such that the first torque measurement, the second measurement, and the third torque measurement each include a dynamic torque measurement.

9. The system of claim 8, further comprising a first transducer coupled to the first shaft configured to gather data associated with angular acceleration of the first shaft during the first torque measurement, the second torque measurement, and the third torque measurement.

10. The system of claim 9, wherein the controller is configured to calculate moments of inertia associated with the object about three mutually orthogonal axes as the mass property.

11. The system of claim 9, wherein the controller is configured to calculate products of inertia associated with the object as the mass property.

12. The system of claim 9, wherein the controller is configured to calculate principal moments of inertia associated with the object as the mass property.

13. The system of claim 7, wherein the torque sensor is configured such that the first torque measurement includes a first static torque measurement at a first fixed angular position of the first shaft and at the first pivot position of the table, the second torque measurement includes a second static torque measurement at the first fixed angular position of the first shaft and at the second pivot position of the table, the third torque measurement includes a third static torque measurement at the first fixed angular position of the first shaft and at the third pivot position of the table, and
the torque sensor is further configured to gather a fourth static torque measurement at a second fixed angular position of the first shaft and at the first pivot position.

14. The system of claim 13, wherein the controller is configured to calculate a mass of the object as the mass property based on the first static torque measurement, the second static torque measurement, the third static torque measurement, and the fourth static torque measurement.

15. The system of claim 13, wherein the controller is configured to calculate a center of gravity of the object as the mass property based on the first static torque measurement, the second static torque measurement, the third static torque measurement, and the fourth static torque measurement.

16. A method for determining a mass property of an object, comprising the steps of:
fixing the object to a table centered on a first end of a vertical shaft at a first pivot position, the second end of the vertical shaft being mounted on an inclined shaft extending approximately 54° from vertical;
gathering a first torque measurement on the inclined shaft;
pivoting the table from the first pivot position into a second pivot position, the second pivot position being 120° from the first pivot position;
gathering a second torque measurement on the inclined shaft;
pivoting the table from the second pivot position into a third pivot position, the third pivot position being 120° from the first pivot position and the second pivot position;
gathering a third torque measurement on the inclined shaft; and
calculating the mass property of the object based on the first torque measurement, the second torque measurement, and the third torque measurement.

17. The method of claim 16, wherein the step of pivoting the table from the first pivot position into the second pivot position includes maintaining an initial position of the object relative to the table, and wherein the step of pivoting the table from the second pivot position into the third pivot position includes maintaining the initial position of the object relative to the table such that the first torque measurement, the second torque measurement, and the third torque measurement are gathered in the initial position of the object relative to the table.

18. The method of claim 17, further comprising:
after the fixing step, a first step of oscillating the vertical shaft, the table, and the object about a longitudinal axis of the inclined shaft, wherein the step of gathering the first torque measurement includes gathering a first dynamic torque measurement after the first oscillating step; and
after the step of pivoting the table from the first pivot position into the second pivot position, a second step of oscillating the vertical shaft, the table, and the object about the longitudinal axis of the inclined shaft, wherein the step of gathering the second torque measurement includes gathering a second dynamic torque measurement after the second oscillating step; and
after the step of pivoting the table from the second pivot position into the third pivot position, a third step of oscillating the vertical shaft, the table, and the object about the longitudinal axis of the inclined shaft, wherein the step of gathering the third torque measurement includes gathering a third dynamic torque measurement after the third oscillating step.

19. A system for measuring moments of inertia about three axes of a vehicle component with an irregular shape, the system comprising:
a first shaft with a first end and a second end, the first end of the first shaft being mounted on a fixture such that the first shaft is inclined at an angle of approximately 54.73° relative to vertical;
a second shaft with a first end and a second end, the first end of the second shaft being coupled to the second end of the first shaft such that the second shaft is vertical;
a table mounted on the second end of the second shaft in an generally horizontal plane and supporting the object, wherein the table is configured to pivot about the second shaft between a first pivot position, a second pivot position that is 120° from the first pivot position, and a third pivot position that is 120° from the second pivot position, wherein the vehicle component maintains a constant position relative to the table in the first pivot position, the second pivot position, and the third pivot position;
a motor coupled to the first shaft and configured to oscillate the first shaft in each of the first pivot position, the second pivot position, and the third pivot position;
a torque sensor coupled to the first shaft and configured to collect a first dynamic torque measurement on the first shaft upon oscillation of the first shaft when the table is in the first pivot position, a second dynamic torque measurement on the first shaft upon oscillation of the first shaft when the table is in the second pivot position, and a third dynamic torque measurement on the first shaft upon oscillation of the first shaft when the table is in the third pivot position;
a transducer coupled to the first shaft and configured to collect a first angular acceleration measurement of the first shaft upon oscillation of the first shaft when the table is in the first pivot position, a second angular acceleration measurement of the first shaft upon oscillation of the first shaft when the table is in the second pivot position, and a third angular acceleration measurement of the first shaft upon oscillation of the first shaft when the table is in the third pivot position; and
a controller coupled to the torque sensor and the transducer, the controller configured to calculate the moments of inertia of the vehicle component based on the first dynamic torque measurement, the second dynamic torque measurement, the third dynamic torque measurement, the first angular acceleration measurement, the second angular acceleration measurement, and the third angular acceleration measurement.

* * * * *